United States Patent [19]

Mazumder et al.

[11] Patent Number: 4,578,570

[45] Date of Patent: Mar. 25, 1986

[54] BAR CODE PROCESSING APPARATUS

[75] Inventors: Ali T. Mazumder, Waterloo; Armand M. Dumas, Kitchener, both of Canada

[73] Assignee: NCR CANADA LTD.-NCR CANADA LTEE, Mississauga, Canada

[21] Appl. No.: 640,895

[22] Filed: Aug. 14, 1984

[51] Int. Cl.[4] ............................................. G06K 7/10
[52] U.S. Cl. .................................... 235/463; 235/436; 235/466
[58] Field of Search ................ 235/436, 466, 474, 463

[56] References Cited

U.S. PATENT DOCUMENTS

| | | | |
|---|---|---|---|
| 3,761,685 | 9/1973 | Alpert et al. | 235/466 X |
| 3,838,251 | 9/1974 | Herrin | 235/436 X |
| 4,147,295 | 4/1979 | Nojiri et al. | 235/463 |
| 4,276,470 | 6/1981 | Rady et al. | 235/463 |

Primary Examiner—David L. Trafton
Attorney, Agent, or Firm—Wilbert Hawk, Jr.; Albert L. Sessler, Jr.; Richard W. Lavin

[57] ABSTRACT

A plurality of vertically aligned sensing members scan a matrix type bar code on a document. During the scanning of the bar code, the time period between the detection of succeeding bars is determined. An average time period which occurs during the detection of a number of bars is then generated. Each succeeding time period generated as a result of detecting the next bar is divided by the average time period to determine the presence or absence of the bar in addition to the number of spaces preceding the detected bar. This information is used in decoding the bar code label.

10 Claims, 31 Drawing Figures

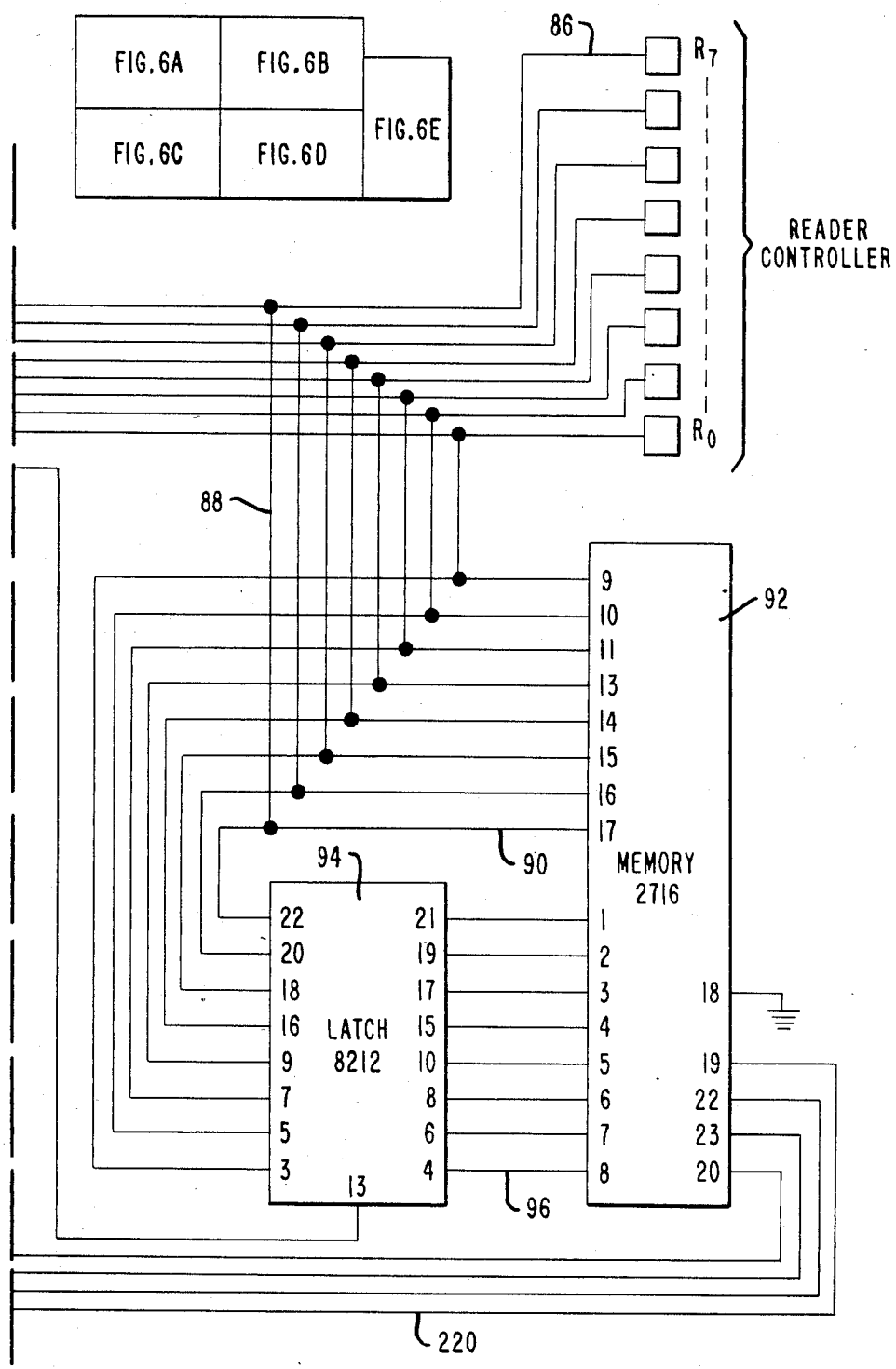

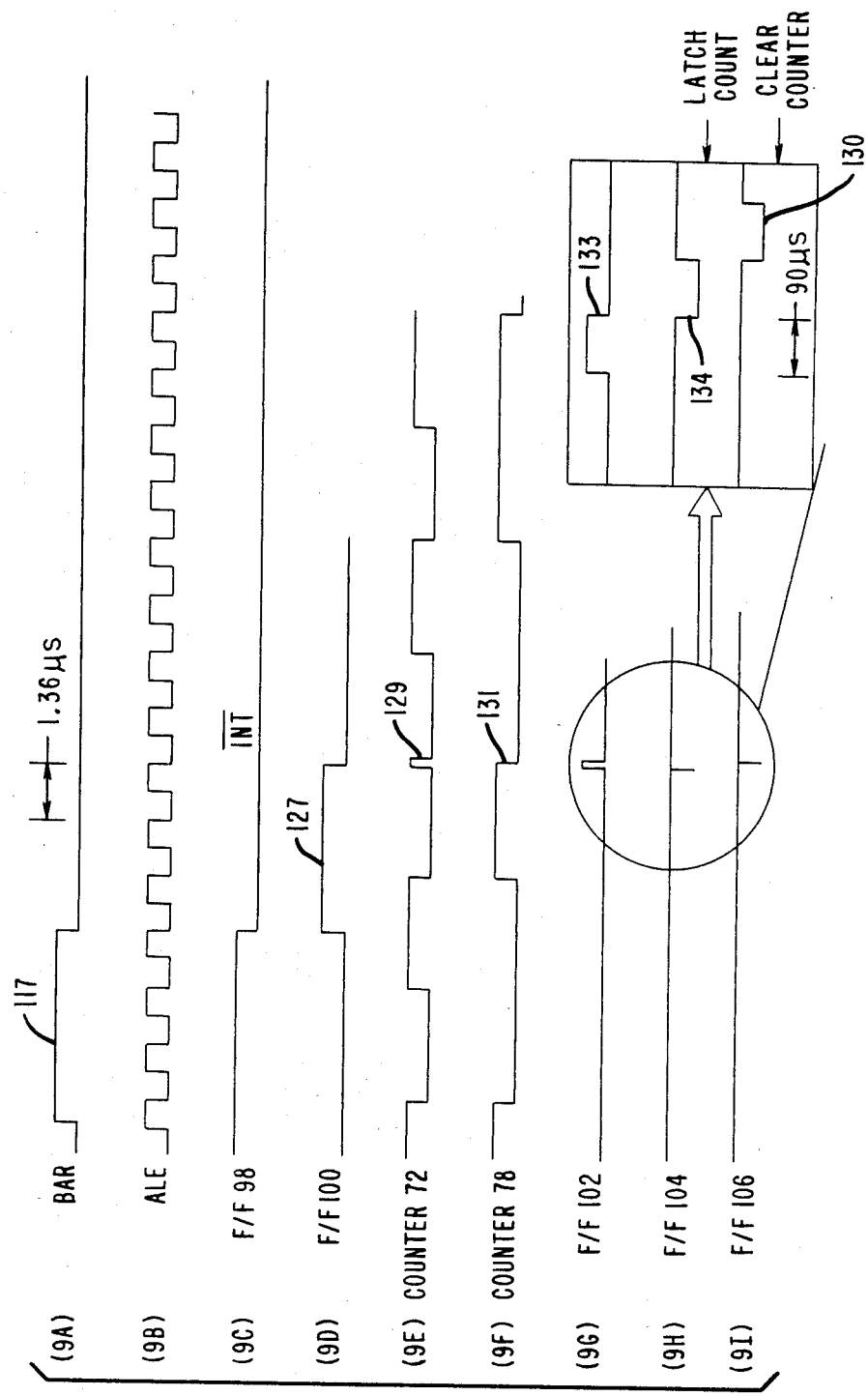

BAR CODE PROCESSING APPARATUS

BACKGROUND OF THE INVENTION

The present invention relates, in general, to optical scanning systems and more particularly, to an optical system for reading bar codes on documents such as bank checks or other types of financial documents.

The use of optical bar codes in printing on financial documents is well-established in the banking industry. In processing these documents, optical readers are employed. Ideally, the presence of a bar would be indicated by one of two states, and the absence of a bar would be indicated by the other of two states. Reading of these documents has become a critical requirement due to the limitations found in the printing of the bars on the documents in which the splattering of ink and the smudging of the bar occurs together with the printing of the bars out of a required position. Because of these conditions, prior bar code readers have been unable to process the documents at the desired speed due to failure to sense all of the bars. Further problems include the printing of bars which are not vertical and the skewed condition of the document when in a reading position. In order to reduce the cost of printing coded bars on a document, matrix printers have been employed for printing bars comprising a row of dots and using fluorescent ink to increase the light intensity reflected from the dots. Using a single-slot type read head in reading bars printed by this type of printing process required expensive transport mechanisms to move the document past the read head at a constant speed in order for the bar code reader to detect correctly all of the printed bars. It is therefore a principal object of this invention to provide a bar code reader which enables the read head to provide a valid read operation irrespective of variations in the speed of the document and the printed position of the bars. It is a further object of this invention to provide a bar code reader for accurately detecting the presence of a bar on a document traveling at a relatively high rate of speed. It is another object of this invention to provide a bar code reader which can read bar codes on a document traveling at a high rate of speed whose construction is relatively simple and therefore low in cost.

SUMMARY OF THE INVENTION

These and other objects of the invention are fulfilled by providing a bar code reader for reading a dot matrix printed coded bar on a document comprising a plurality of vertically-oriented dots printed with a fluorescent ink in which the bar code reader includes a plurality of aligned photo-detector members, each of which is positioned to sense one of the dots of the bar. The voltage signals generated by the sensing members are amplified, filtered, digitized and qualified to provide a binary output signal having a logical state indicating the presence of a bar. In reading the bars, the bar code reader determines the elapsed time between the detection of a plurality of bars to generate an average time period between bars. Using this average time period, the bar code reader will determine the presence or absence of a bar by dividing the time period between succeeding bars by the average time period. Each time a bar is detected, the average time period is updated. The bar code reader using the result of the division determines the location of the number of zeros which precede the detection of a bar.

The foregoing and various other objects, advantages and meritorious features of the present invention will be apparent from the following detailed description and appended claims, when read in conjunction with the drawings, wherein like numerals identify corresponding elements.

BRIEF DESCRIPTION OF THE DRAWINGS

FIGS. 6A-6E inclusive taken together disclose the speed variation logic circuit of the bar code reader.

FIG. 7 is a diagram showing the manner in which FIGS. 6A-6E inclusive are arranged to form the speed variation logic circuit.

FIGS. 9A-9I inclusive show additional wave forms associated with the operation of the preferred embodiment of the invention.

DESCRIPTION OF THE PREFERRED EMBODIMENT

It should be noted at this time that, throughout this description of the preferred embodiment, the presence of a slash (/) following either a symbol or an acronym represents the logical inversion of that symbol or acronym.

Figure 1:
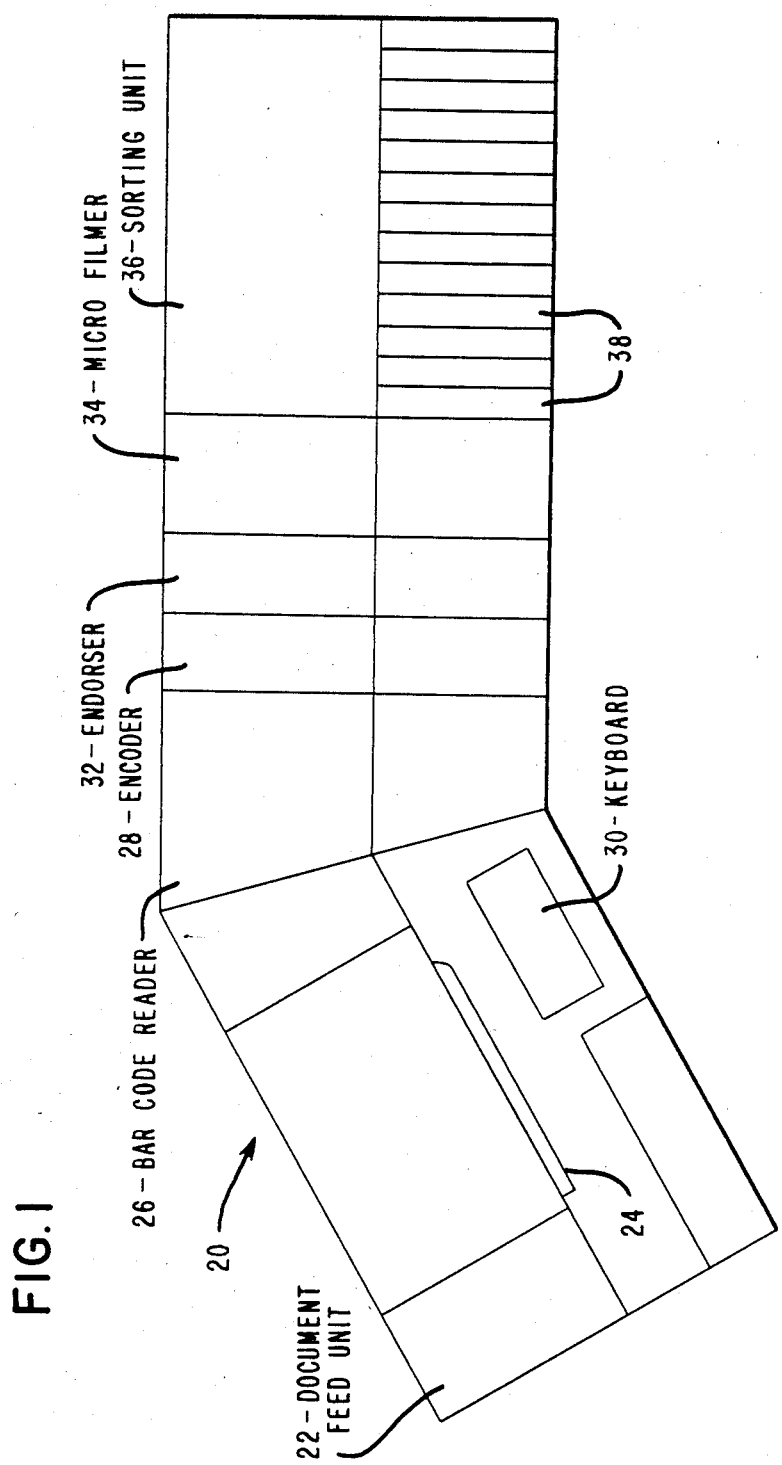
FIG. 1 is a plan view of a check document processing apparatus which includes the bar code reader of the present invention.

Referring now to FIG. 1, there is shown a plan view of a check processing apparatus 20 used in processing bank checks or other financial documents as part of a bank proof operation. Included in the apparatus 20 is: a document feed unit 22 in which documents to be processed are fed serratim into a document transport mechanism (not shown) located within the apparatus 20 for transporting the document through the apparatus; a CRT display unit 24 for displaying the face of the document being transported; a bar code reader 26, which is the subject of the present invention, for reading a bar code printed on the documeht; an encoder mechanism 28 for printing data on the document and control characters used in processing the document (inserted from a keyboard 30); an endorser mechanism for endorsing the document processed; a microfilm mechanism 34 for microfilming the document; and a sorting module 36 comprising a plurality of storage pockets 38 in which documents are stored according to their destination. Also included within the apparatus 20 is an image lift unit for scanning the face of the document and generating signals used for displaying the face of the document on the CRT 24. The present invention is directed to the bar code reader 26 for reading the bar code printed on the document in order to increase the speed of the document through the apparatus 20 while providing a high sensing accuracy of the bar code.

Figure 2:
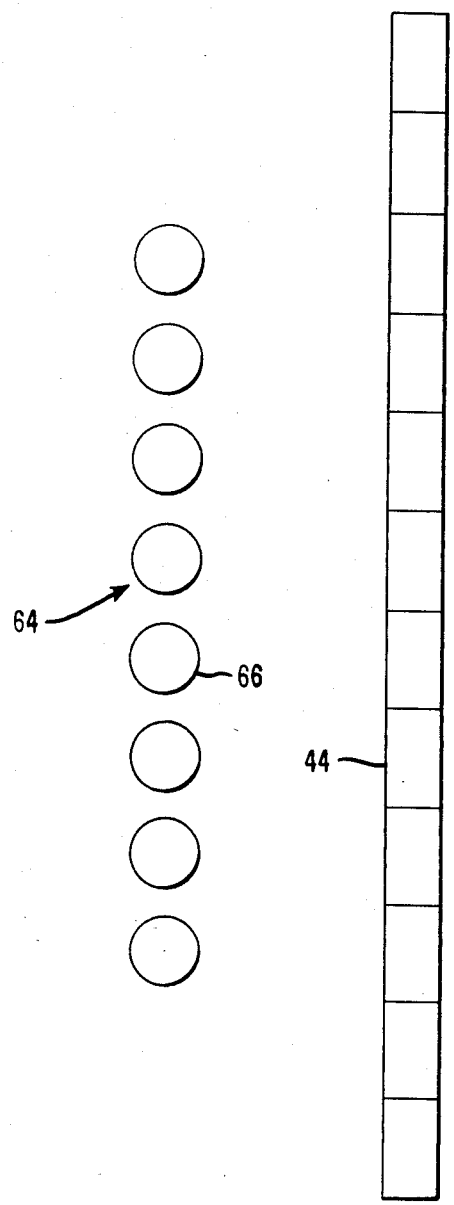
FIG. 2 is a schematic representation of a bar showing the location of the dots with respect to the photo-detector sensing elements.
Figure 3:
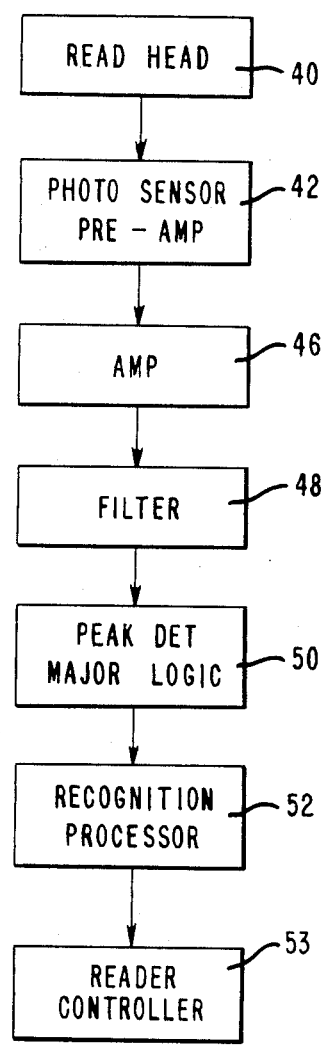
FIG. 3 is a functional block diagram of the bar code reader of the present invention.

Referring now to FIG. 3, there is shown a functional block diagram of the bar code reader 26 comprising: a read head 40 which includes a light sensor mechanism for generating light beams and optical elements arranged in a conventional manner to focus the light beams at the surface of the document and for gathering the reflected light beams from the document; a photosensor and pre-amp block 42 which includes a plurality of photo-detectors 44 (FIG. 2) each of which detects the reflected light and generates a current whose level is proportional to the amount of light detected and a pre-amplifier stage for amplifying the output of the photo-detectors; an amplification block 46 which includes a stage of amplifiers for amplifying the output signals of the pre-amplifier block 42; a filter block 48 for filtering out unwanted noise in the signals received from the amplification block 46; a peak detector and majority selection block 50 for digitizing the analog signal output of the filter block 48 and for qualifying the digital signals as a bar or not; a recognition processor block 52 for decoding the bars detected by the read head block; and a reader controller 53 for controlling the operation of the system. For a complete description of the blocks 40-50 inclusive, reference should be made to the co-pending patent application of Mazumder, Ser. No. 439,148, filed Nov.4, 1982, and assigned to the assignee of the present application.

Figure 4:
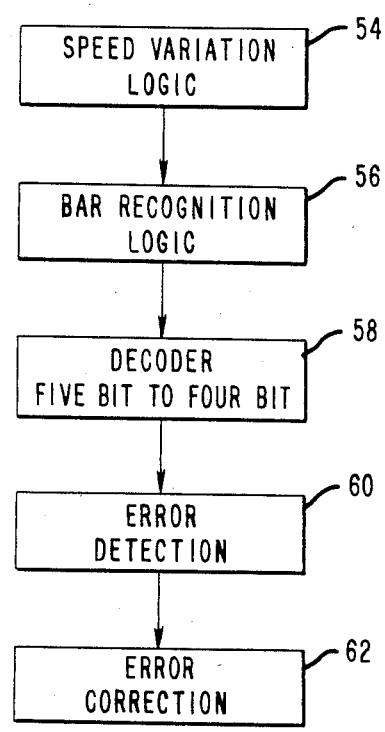
FIG. 4 is a functional block diagram of the recognition procssor block of FIG. 3.

Referring now to FIG. 4, there is disclosed a block diagram of the recognition processor block 52 (FIG. 3) of the present invention which includes: a speed variation logic block 54, for generating signals representing the average time period occurring between successive bars; a bar recognition logic block 56, for detecting the presence or absence of a bar in the data being read; a decoder block 58, for decoding the 5-bit binary data character represented by the bars detected to a 4-bit binary data character; an error detection block 60, for detecting an error in the reading of the bars; and an error correction block 62, for correcting the errors found by the block 60.

Figure 5:
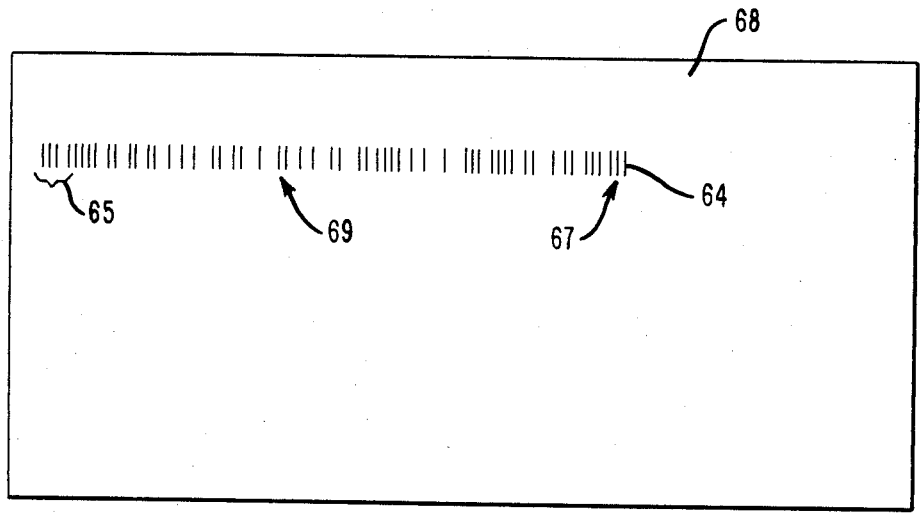
FIG. 5 is a plan view of a document showing an example of the printed bar code which includes a start and stop code.

Referring now to FIG. 2, there is shown a schematic representation of a bar sensed by the bar code reader and printed on a document transported through the apparatus 20 (FIG. 1). The bar indicated generally by the numeral 64 comprises a series of eight printed dots 66 vertically aligned to form the bar and which are printed in fluorescent ink. Aligned with the bar 64 in a sensing position are twelve photo-detectors 44 which comprise the read head block 40 (FIG. 3) in which eight of the photo-detectors will be positioned to sense the eight dots 66 comprising the bar 64. The upper two photo-detectors 44 and the lower two photo-detectors provide detection of the bar 64 during an over-scan or under-scan read condition which occurs due to the misalignment of the photo-detectors 44 with the bar 64. As shown in FIG. 5, the bars 64, printed on a document 68, comprise a code in which the presence or absence of a bar within a prescribed number of bar positions represents a character in a manner that is well-known in the art. The code includes: a 5-bit start code 65; a 3-bit stop code 67; and a data portion 69 consisting of a plurality of data characters, each comprising a 5-bit code representing a 4-bit hexadecimal character in which no more than two consecutive zeros will occur together. This code is shown in the following Table:

TABLE 1

| Hexadecimal Data | 5 Bit Code Representation |
|---|---|
| 0000 | 01001 |
| 0001 | 01010 |
| 0010 | 01011 |
| 0011 | 01101 |
| 0100 | 01110 |
| 0101 | 01111 |
| 0110 | 10010 |
| 0111 | 10011 |
| 1000 | 10101 |
| 1001 | 10110 |
| 1010 | 10111 |
| 1011 | 11001 |
| 1100 | 11010 |
| 1101 | 11011 |
| 1110 | 11101 |
| 1111 | 11110 |

Referring now to FIGS. 6A-6E inclusive, there is shown the logic circuit for the speed variation logic block 54 of FIG. 4. Included in the circuit is an 8049 microprocessor 70 (FIGS. 6A and 6C) which is commercially available from the Intel Corporation of Santa Clara, Calif. Unless otherwise specified, all numbered logic circuits are commercially available from the Texas Instruments Corporation of Dallas, Tex. Associated with the processor 70 is a 7493 divide-by-eight counter 72 (FIG. 6D) which receives over line 74 from the processor 70 the 11 MHz. clock signals ALE (FIG. 9B). The counter 72 after reaching a count of 8, will output a pulse over line 76 to a 74393 counter 78 (FIG. 6D) whose output count appearing on lines 80 is inputted to a 74LS374 latch 82. The latch 82 has its output lines 84 connected to a number of bi-directional lines 86 (FIG. 6B) which are connected to the processor 70. The lines 86 are further connected over the bi-directional lines 88 (FIG. 6E) to the output lines 90 of a 2716 memory unit 92 (FIG. 6E) in which the programs for operating the processor 70 are stored.

The output lines 90 of the memory unit 92 are also connected to an 8212 latch member 94 whose output lines 96 are inputted into the memory unit 92 over which data used in addressing the memory unit 92 are transmitted. The logic circuits further include a plurality of D-type 7474 flip-flops 98-116 (even numbered) inclusive (FIGS. 6C and 6D) which are used for processing the input binary signals representing the detection of a bar. As previously described, the code used in the present embodiment is a 5-bit code in which no more than two consecutive zeros will occur. Whenever the peak detector and majority logic block 50 (FIG. 3) has determined that the number of signals generated by the photo-detectors 44 (FIG. 2) constitute a valid bar, a high signal 117 (BAR) (FIG. 9A) will appear on line 118 (FIG. 6C) for input into an inverter 120 and outputted over line 122 to the flip-flop 98 clocking the flip-flop resulting in the outputting of a low signal INT/ (FIG. 9C) over line 124 to the processor 70. As will be explained more fully hereinafter, the signal INT/ will interrupt the processor 70 enabling the processor to read the output count of the counter 78 which is now stored in the latch member 82 (FIG. 6D). The count represents the elapsed time between the detection of two successive bars.

The flip-flop 98 will also output, over line 126, a high signal to the flip-flop 100 clocking the flip-flop which results in the outputting of a high signal 127 (FIG. 9D) over line 128. This signal ripples through the flip-flops 102, 104 and 106 (FIG. 6D) resulting in a low signal 130 (FIG. 9I) appearing on the output line 132 of the flip-flop 106 which resets the counter 78. The flip-flops 104 and 106 are clocked by the 11 MHz. clock signal CLKB (FIG. 8D) received over line 103 (FIG. 6B) from the reader controller 53 (FIG. 3). Prior to this occurrence, a low signal 134 (FIG. 9H) appearing on the output line 136 of the flip-flop 104 and which is generated as a result of the flip-flop 98 outputting the signal 127 (FIG. 9D), is transmitted over line 138 (FIG. 6D) to the latch 82 enabling the latch to store the output count of the counter 78. As may be seen from FIGS. 9E and 9F, the output of the counter is latched between the counts of the counter 78. The low signal 134 transmitted over lines 136, 138, 140 will also reset the counter 72 (FIG. 6D).

Resetting of the counter 72 (FIG. 6D) results in the short signal 129 (FIG. 9E) appearing on the output line 135 of the counter 72 which clocks the flip-flop 102 (FIG. 6C) producing the signal 133 (FIG. 9G) on the output line 137 of the flip-flop 102. This signal triggers the flip-flop 104 (FIG. 6C) resulting in the outputting of the signal 134 (FIG. 9H) over line 136 which latches the output of the counter 78 in the latch 82. As previously described, counter 72 (FIG. 6D), receiving the 11 MHz. signal ALE (FIG. 9B) over line 74 from the processor 70, will divide the clock signal by 8 to output a pulse for transmission over line 76 to the counter 78. The output of the counter 78 is stored in the latch 82. Upon the generation of the low signal INT/ (FIG. 9C), the processor 70 will read the count appearing on the output lines 84 of the latch 82 which are transmitted over lines 86 to the processor. Each time a bar signal 117 (FIG. 9A) appears on line 118 (FIG. 6C), the count appearing at the output of the latch 82 is read by the processor. As will be described more fully hereinafter, the processor 70 will sum the counts for the first four bars detected, divide the sum by the number of bars read to output an average count $T_{REF}$. Each time a new bar is detected, the earliest count is dropped and the new count is added to derive a new $T_{REF}$. Thus, $T_{REF}$ is updated as the bar code is read. The count $T_{REF}$ is then divided into the latest count to determine the presence of a bar and the number of zeros that precede the bar in the code in a manner that will be described more fully hereinafter.

As described previously and as disclosed in Table 1, each 5-bit data character may include no more than two consecutive zeros. When detecting a condition where two or more bars are missing, the counter 78, which is limited to a 256 count, will go into a first overflow condition where eight zero spaces are counted or a second overflow condition where 16 zero spaces are counted. When a first overflow condition is present, in which the count (FIG. 8A) of the counter 78 exceeds the count of 256 by a predetermined amount, a high signal 142 (FIG. 8B) representing the most significant bit of the count appearing on line 80 will appear at pin 8 of the counter 78 (FIG. 6D). The high signal 142 will be transmitted over line 144 to the output of the flip-flop 108 (FIG. 6C) which at this time is being clocked by the 11 MHz. signal CLKB (FIG. 8D) appearing on line 146 and transmitted over line 103 (FIG. 6B) from the reader controller 53 through the NAND gate 148 (FIG. 6D). The clocking of the flip-flop 108 outputs a low signal 150 (FIG. 8E) over line 152 whose rising edge will clock the flip-flop 110. Clocking of the flip-flop 110 will set the flip-flop to output a high signal 154 (FIG. 8F) over line 156 to the pin 36 input of the processor 70 which, when enabled, will check this input for the presence of an overflow condition.

Figure 8:
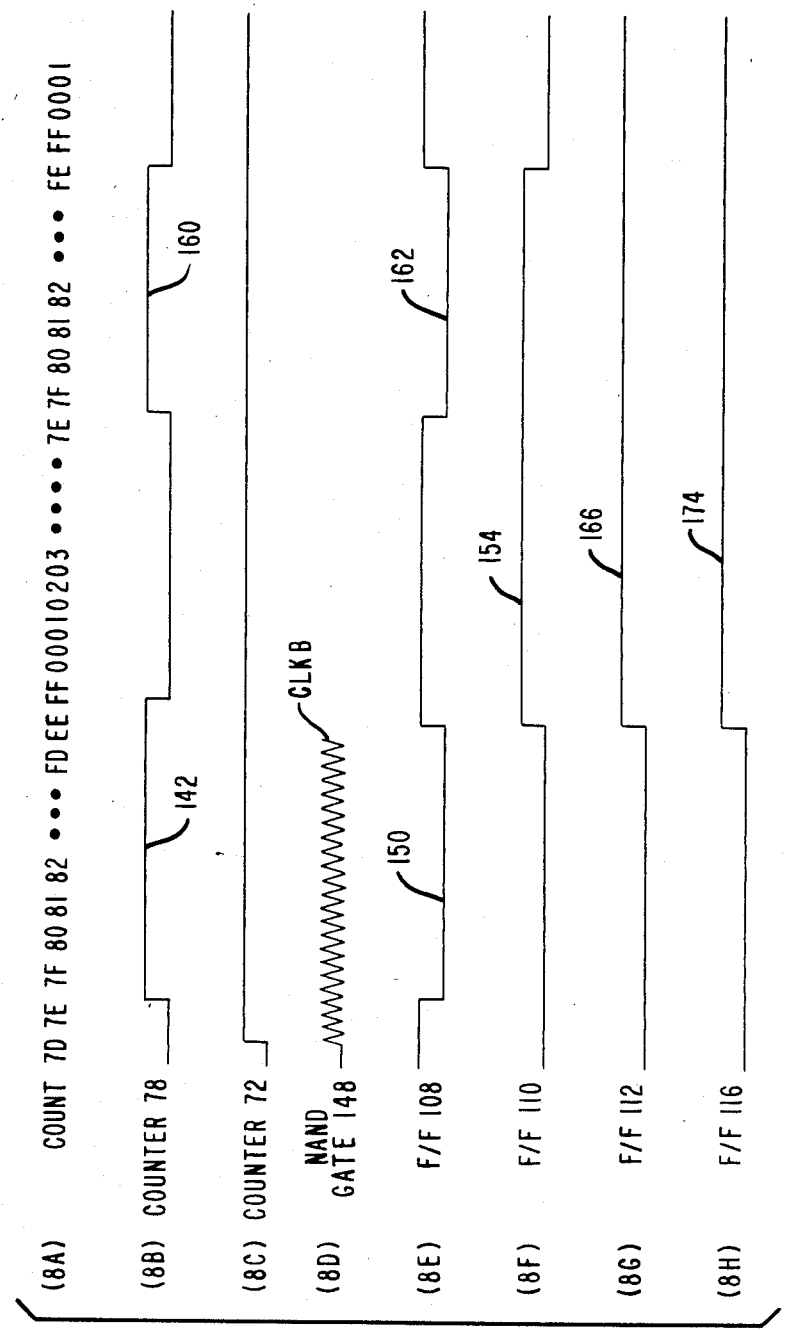
FIGS. 8A-8H inclusive show various wave forms associated with the overflow operation of the preferred embodiment of the invention.

If the counter 78 continues counting and goes into a second overflow condition, a second high signal 160 (FIG. 8B) will be outputted over lines 80, 144 to the flip-flop 108 clocking the flip-flop in the manner described previously. As shown in FIGS. 8E and 8F, upon the occurrence of the rising edge of the signal 162 outputted by the flip-flop 108, the high signal 154 appearing on the output of the flip-flop 110 will be removed. At this time the flip-flop 112 which has been clocked by the low signal appearing on the output line 164 of the flip-flop 110 is set to output the high signal 166 (FIG. 8G) over line 168 to the pin 37 input of the processor 70 (FIG. 6A) indicating that the counter 78 is in a second overflow condition. With either of the flip-flops 110 or 112 set to indicate an overflow condition, the resetting of the counter 78 can occur without losing the overflow indicators appearing at the input pins 36 or 37 of the processor 70.

During the detection of a bar with the subsequent clocking of flip-flops 98–106 (even numbered) inclusive in the manner described previously, the flip-flop 104 (FIG. 6C) will output a low signal over line 170 to the flip-flop 114 setting the flip-flop to output a low signal to one input of the NAND gate 148 (FIG. 6D), thereby disabling the 11 MHz. clock signal CLKB appearing on line 146 from being inputted into the flip-flop 108. This prevents the flip-flops 110 and 112 from being triggered to lose the overflow indicators upon the resetting of the counter 78 when a new bar is detected.

When the flip-flop 110 (FIG. 6C) is set to output the high signal 154 (FIG. 8F) to the processor 70 over line 156, the signal is also transmitted over line 172 to the flip-flop 116 (FIG. 6C) clocking the flip-flop resulting in a high signal 174 (FIG. 8H) being transmitted over line 176 (FIG. 6E) to the $T_O$ input pin of the processor 70. As will be described more fully hereinafter, when the signal INT/ (FIG. 9C) is raised to the processor 70, the processor will check the input pin $T_O$ to see if an overflow condition has occurred. If the signal is high, the processor will look at the input pins 36 (first overflow) and 37 (second overflow). If the first overflow condition is present, the processor will divide the count by $T_{REF}$ and if a second overflow condition is present the processor will double the value previously obtained by dividing by $T_{REF}$.

Various control signals are transmitted from the reader controller 53 (FIG. 3) to the processor 70 for controlling the operation of the processor which includes the signals DETECT (FIG. 6B) appearing on line 178 and SDOC appearing on line 180 which are raised for evaluating the operation of the processor 70. Appearing on line 182 is the signal DOC PRES which goes high when the edge of the document 68 (FIG. 5) on which is printed the bar code to be detected. The signal DOC PRES will enable the 221 one-shot circuit 184 (FIG. 6B) to output, after a short delay, a high signal over line 186 to the processor 70 (FIG. 6A) indicating the location of the first bar of the start code 65 (FIG. 5) of the bar code. Appearing on lines 188 and 190 are handshake signals BARL/ and BAKW which set a flip-flop 192 (FIG. 6B) to output a signal over line 194 to the processor 70. A write signal WRI/ appearing on line 196 and transmitted over line 194 to the processor 70 initiates a write operation by the processor to transfer data bits $R_0$–$R_7$ (FIG. 6E) over lines 86 to the reader controller 53. A reset signal RSTP/ is transmitted over line 198 to reset the processor 70. In addition, the signal RSTP/ is also transmitted over line 199 (FIGS. 6A and 6C) through the NAND gate 200 which also receives an enabling signal from the processor 70 over line 202. The output signal of the NAND gate 200 is transmitted over line 204, through the inverter 206 and over lines 208 and 210 (FIG. 6C) for resetting the flip-flops 98, and 108-116 (even numbered) inclusive. Appearing on line 212 (FIG. 6B) is the 11 MHz. clock signal CLKA and on line 103 is the 11 MHz. clock signal CLKB with the latter used in clocking the flip-flops 104 and 108 (FIG. 6C) and the flip-flop 106 (FIG. 6D).

Further included in the logic circuit is an 8243 I/O circuit 214 (FIG. 6A) which transfers data between the processor 70 and the reader controller 53. Included in the transferred data are: mode data bits, MODE 0-3 inclusive, appearing on lines 216; diagnostic bits SD0-SD3, appearing on lines 218; and control bits which are transferred over lines 220 to the memory device 92 (FIG. 6E) for storing data in the memory device. The I/O device 214 receives over line 222 an inverter signal from the inverter 224 (FIG. 6A) derived from a lamp sensor 226 indicating the operation of the photodiode 44 (FIG. 2). The processor 70 also receives over lines 228, 230 (FIG. 6A) the control signals DATAT and DSCH, respectively and over lines 232, 234 a delayed control signal from the 221 one-shot circuit 236 for controlling the operation of the processor.

Figure 6A:
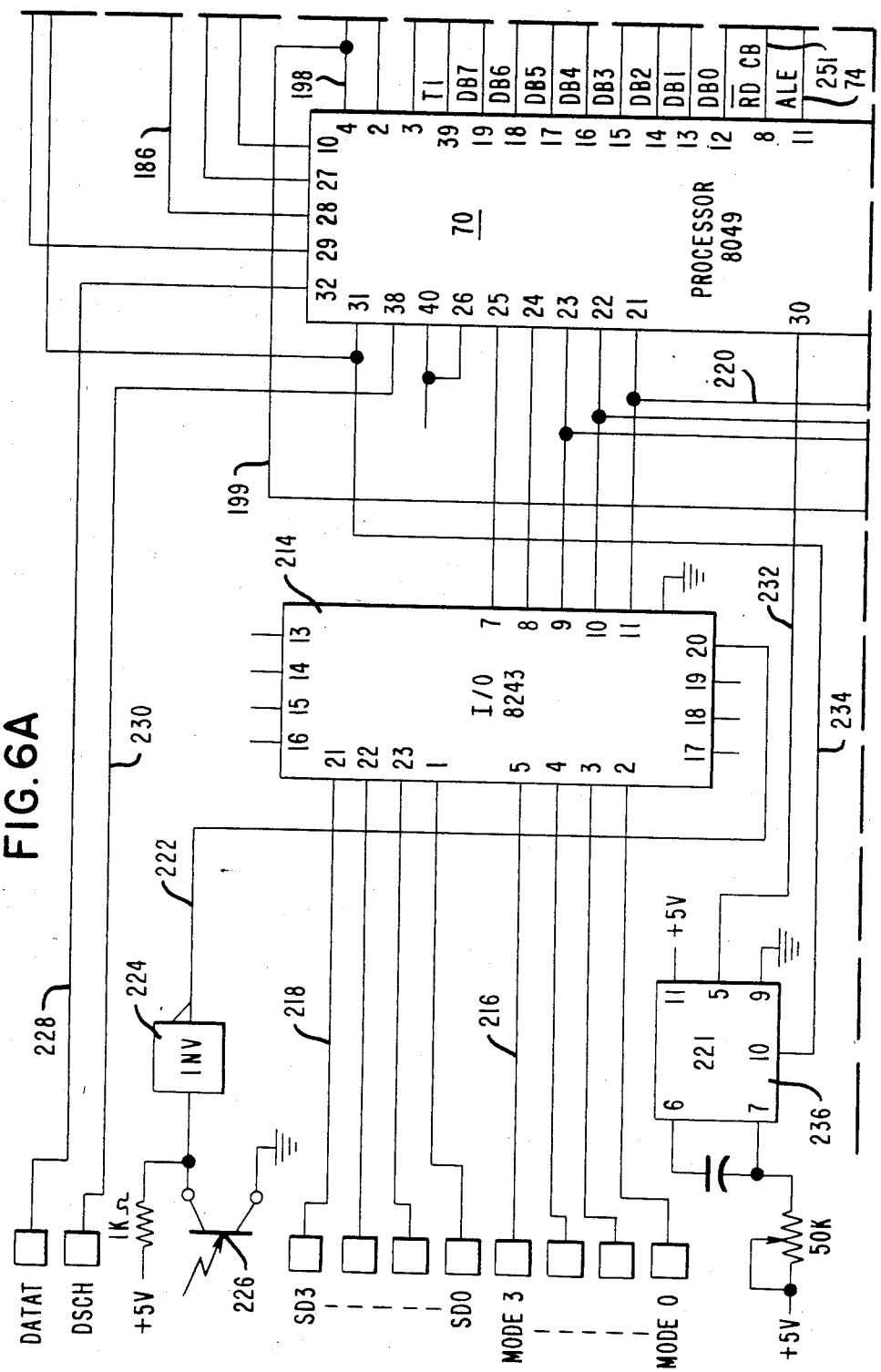
Figure 6B:
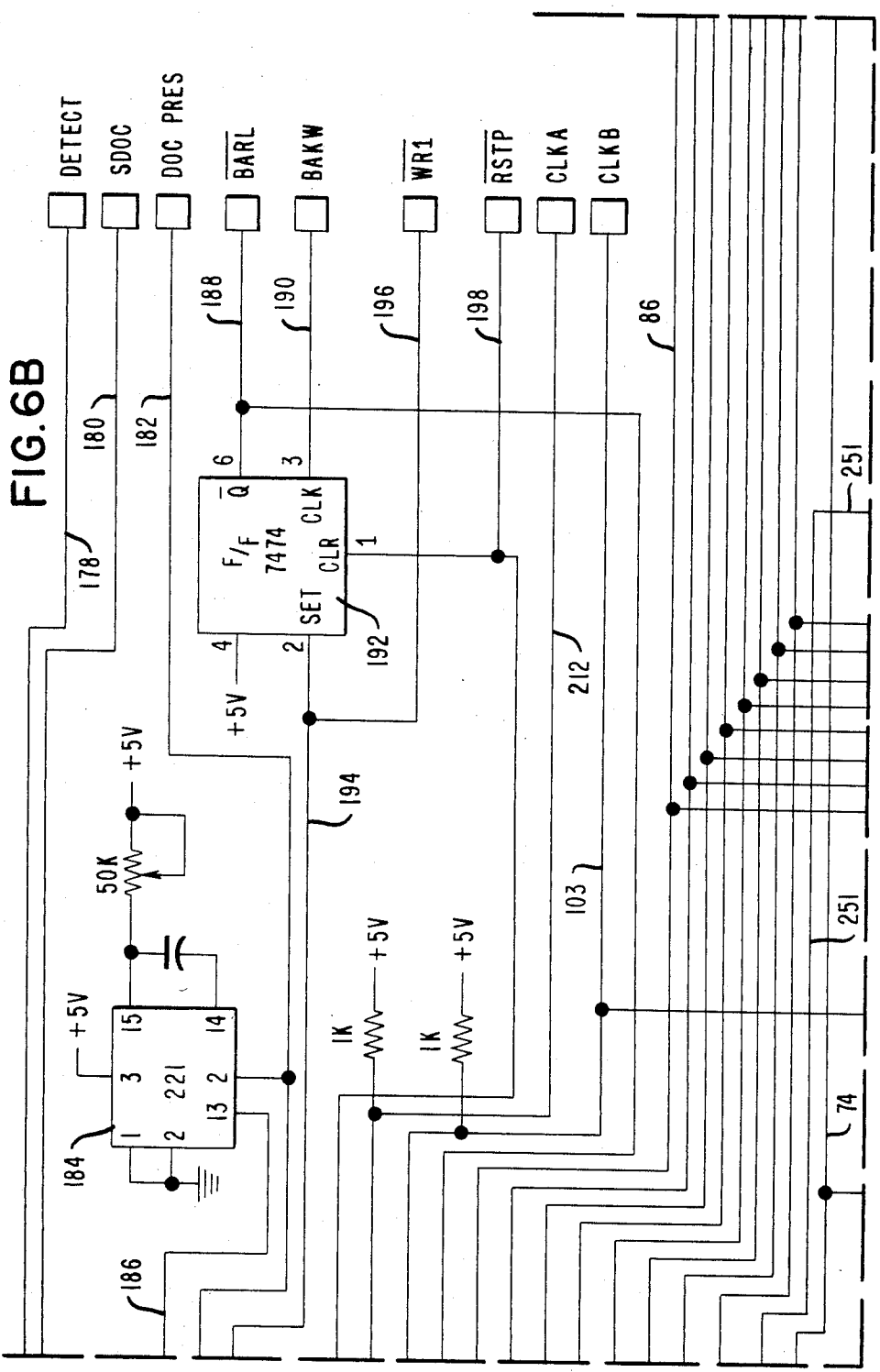
Figure 6C:
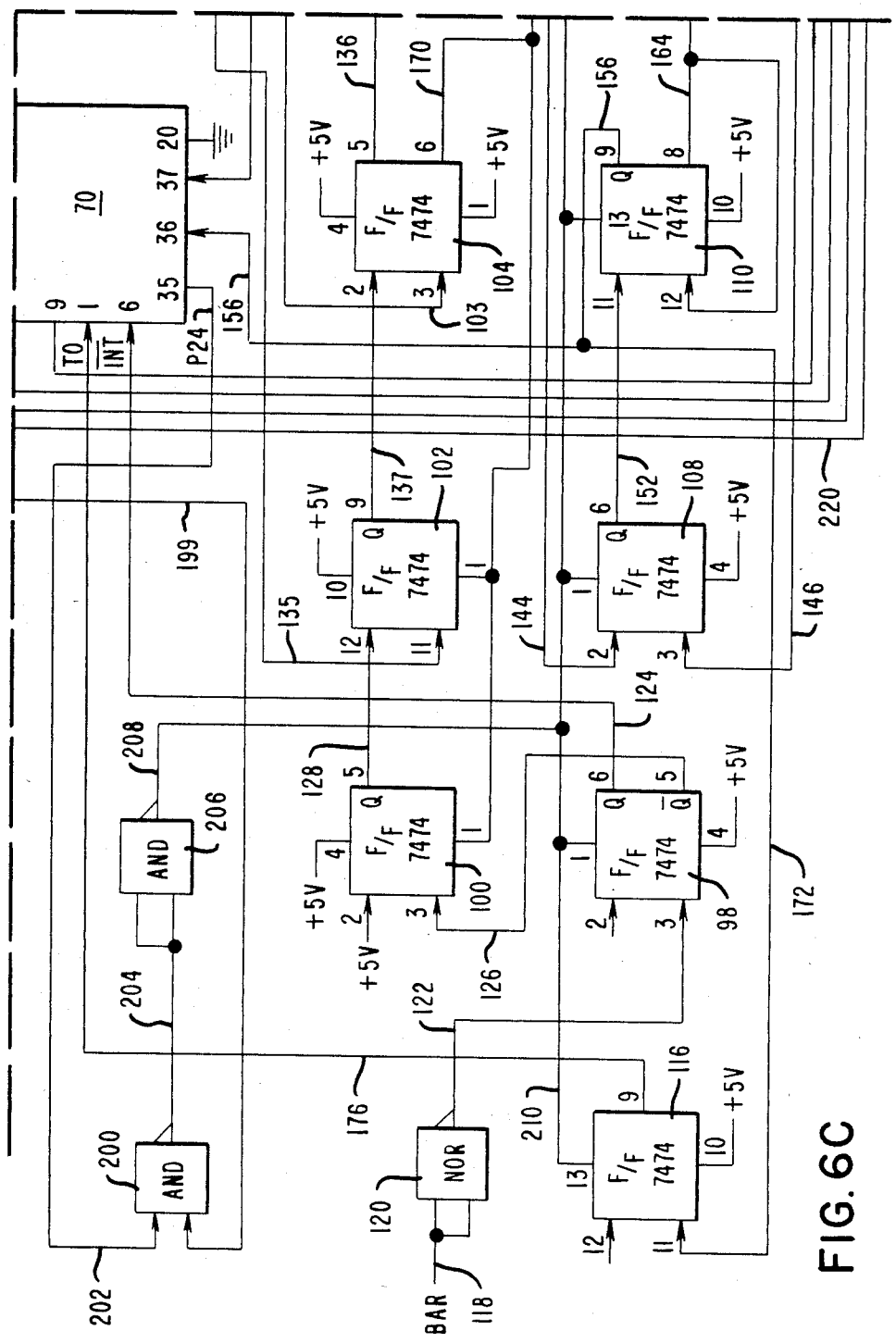
Figure 6D:
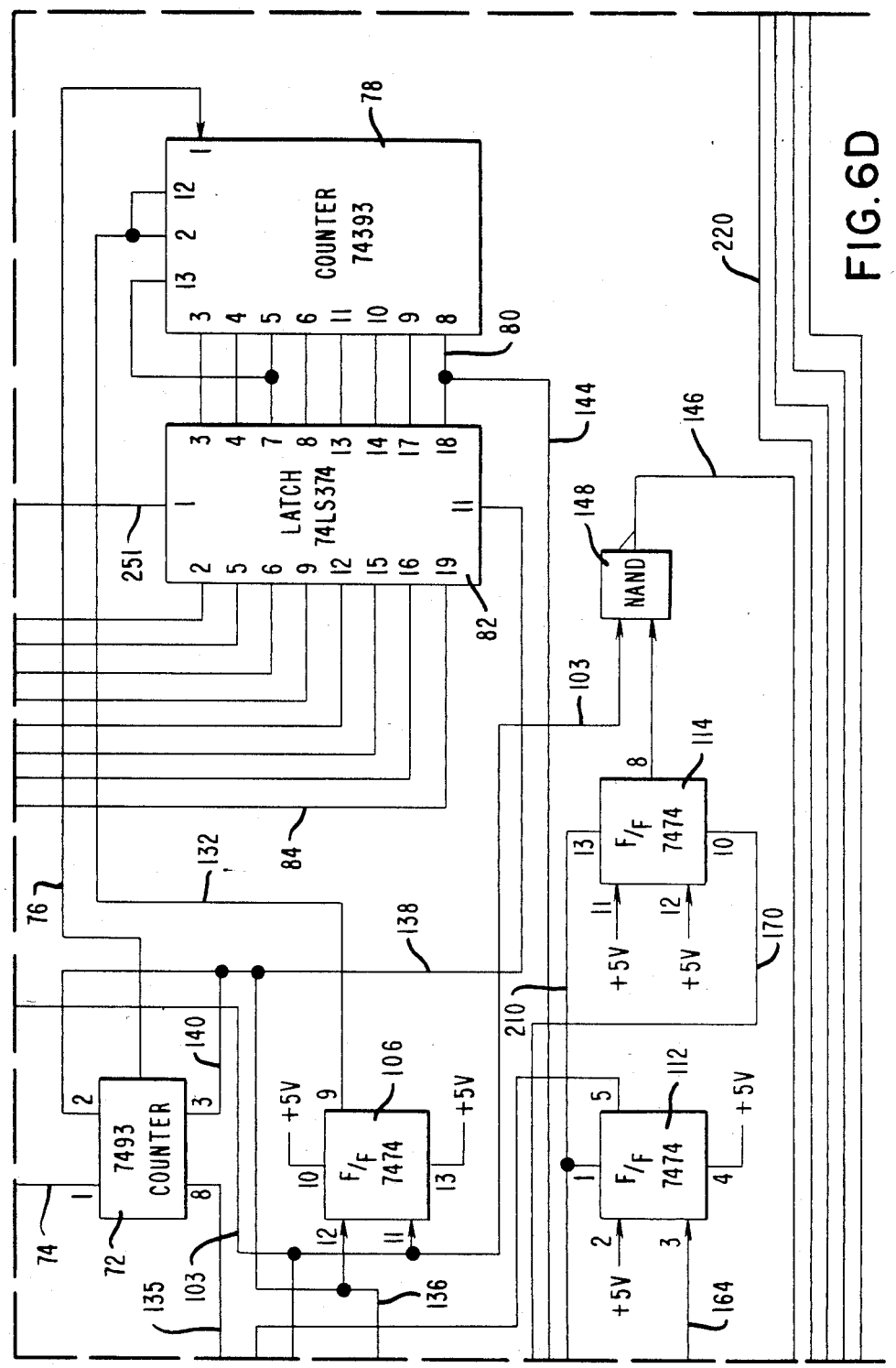
Figure 10A:
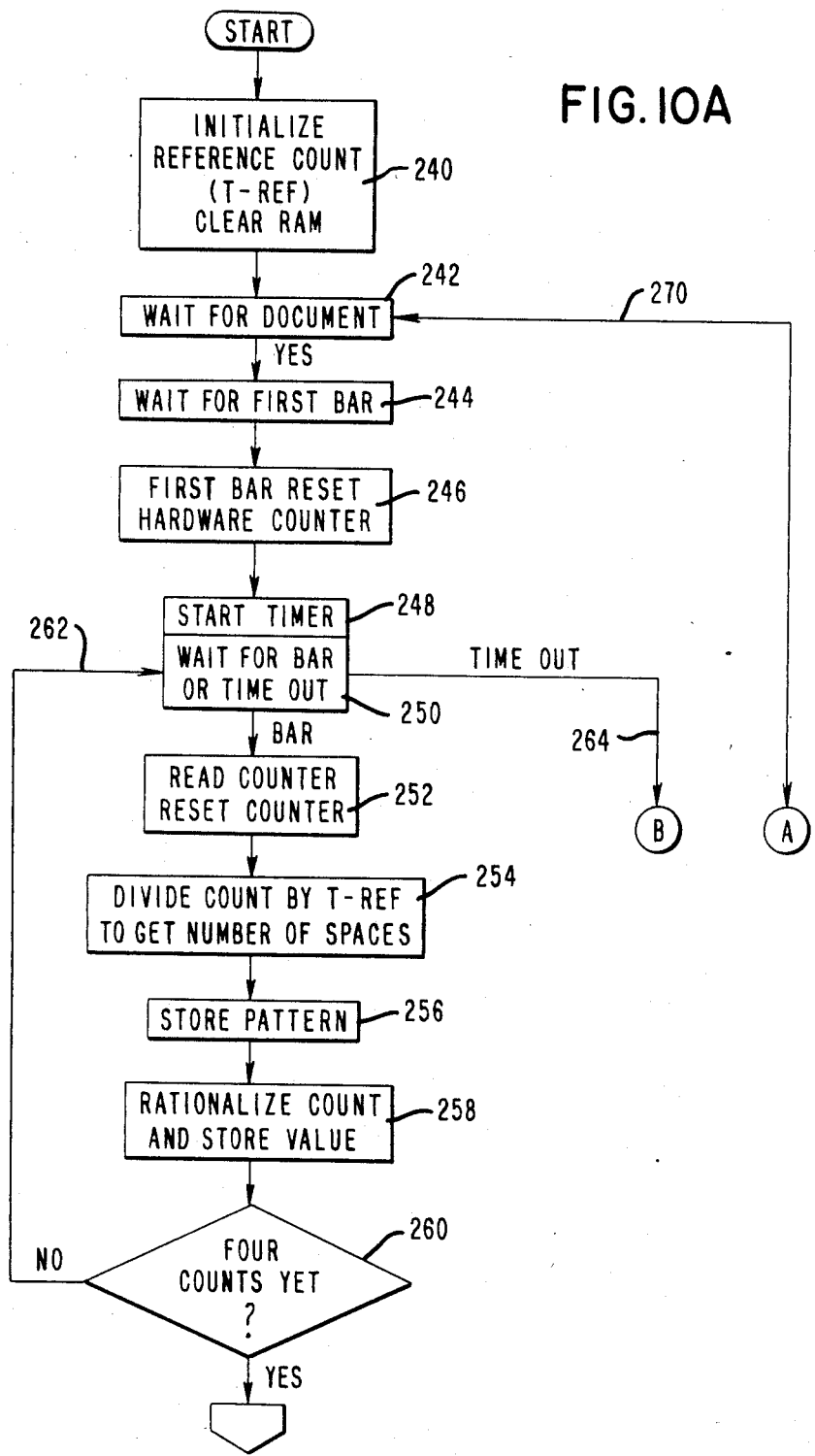
FIGS. 10A and 10B taken together represent a flowchart of the operation of the processor portion of the preferred embodiment of the invention.
Figure 10B:
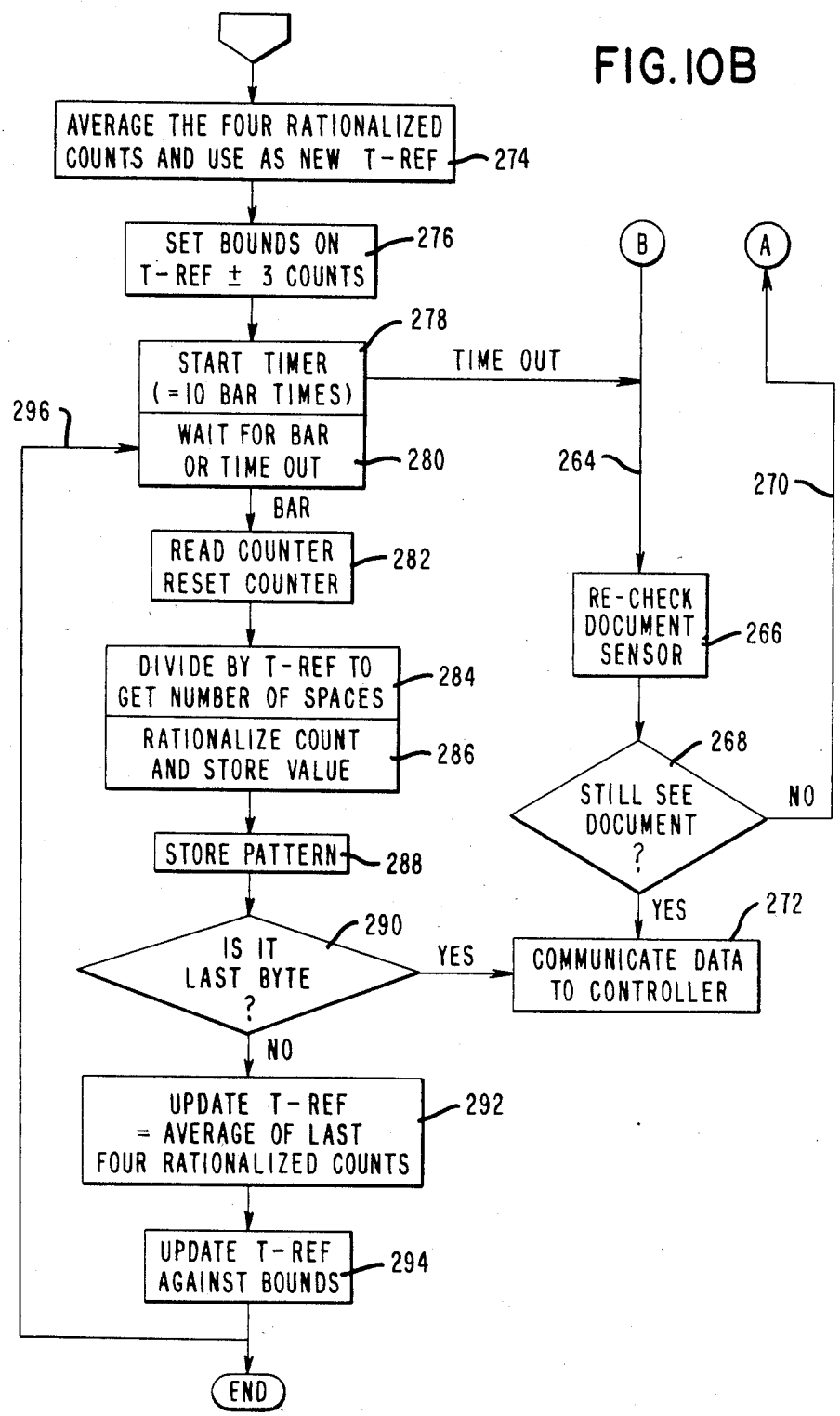

Referring now to FIGS. 10A and 10B, there is disclosed a flowchart of the operation of the processor 70 (FIG. 6A). The processor 70 will initiate (block 240) the reference count ($T_{REF}$) by generating an average count based on the projected design speed of the document 68 (FIG. 5) past the photodiodes 44 and will clear a RAM (not shown) in the processor. The processor 70 will then wait (block 242) for the raising of the document present signal DOC PRES (FIG. 6B) by a document sensor (not shown) connected to line 182. The processor 70 will then wait (block 244) for the raising (block 246) of the first BAR signal 117 (FIG. 9A) to occur. Upon receiving the first signal INT/ (FIG. 9C), the processor 70 resets the counter 78 (FIG. 6D) and starts an interval timer (not shown) (block 248) which requires that the document be read within 30 milliseconds (block 250) or the read operation will be re-started.

When the BAR signal 117 (FIG. 9A) occurs indicating the detection of a valid bar, the signal INT/ (FIG. 9C) will be raised and sent to the processor 70 which, by raising the signal RD/ over line 251 (FIGS. 6A, 6B and 6D) will read (block 232) the output count (FIG. 6B) of the counter 78 appearing on the output lines 84 of the latch 82 (FIG. 6D). The counter 78 is reset by the signal 130 (FIG. 9I). The processor 70 will divide the count (block 254) read by the average count $T_{REF}$ established prior to the start of the read operation in the manner described previously to determine the bar code pattern. If the quotient of the division operation is a one, a bar will be stored (block 256) in a register (not shown) in the processor 70. If the quotient is a two, the binary bit pattern 01 will be stored, while the binary bit pattern 001 will be stored if the quotient is a three. The processor will then rationalize the count (block 258) by dividing the count by the number of bar intervals found to generate a count and store this count in a second register (not shown). For example, if the count read is 30 and $T_{REF}$ is 13, we get a quotient of 2.30. Taking only the whole number (2) of the quotient and dividing this into the count read, the resulting value (15) is stored in the second register. The processor 70 will then determine if four counts have been read, indicating the detection of four bars. In the present embodiment, the count of the first four bars is summed and divided by 4 to generate the new average count $T_{REF}$. If four bars have not been detected at this time, the processor 70 will return (line 262) to an operating position waiting for the occurrence of a bar (block 250). If during this time, a time-out occurs, the processor will check (line 264) (FIGS. 10A and 10B) to see if the document sensor which generates the signal DOC PRES is still operating (block 266) (FIG. 10B) and that the signal DOC PRES (FIG. 6B) is still available (block 268). If the signal is not present, the processor will (line 270) (FIGS. 10A and 10B) again wait for the presence of a document (block 242) (FIG. 10A). If the document is present, it will communicate data to the reader controller 53 (FIG. 3) (block 272) (FIG. 10B) indicating the status of the document.

If the processor 70 has determined that four total counts have been detected, the processor 70 will average (block 274) the four counts by summing the counts read and dividing the sum by 4 to generate the average count $T_{REF}$ existing between the succeeding bars. In order to insure that we are reading the bar code, the processor will set a boundary of the number of counts that can occur without detecting a bar to eliminate the value of $T_{REF}$ collapsing to zero. In the present example, assume that the boundary for the $T_{REF}$ is plus or minus three counts. The processor 70 starts an interval timer (not shown) (block 278) which is constructed to time-out after ten bar times have elapsed where a bar time is based on the printing of the bars at a predetermined spacing and the projected speed of the document. The processor will then wait (block 280) for the generation of the next interrupt signal INT/ (FIG. 9C) or the timing-out of the interval timer. If a time-out occurs, the processor will recheck (line 264) the document sensor (block 266) to determine if the document is still present (block 268). If it is not, it will wait for the document (block 242) (FIG. 10A). If the document is present, the processor will transmit data indicating the time-out operation to the reader controller 53 (FIG. 3).

If the processor 70 receives the signal INT/, it will read the counter 78 (block 282) which is then automatically reset by the signal 130 (FIG. 9I). The processor then divides the count (block 284) to get the number of spaces detected and the bar code pattern. The processor will rationalize the count and store the value of the count (block 286). The processor then stores the bar code pattern (block 288) and checks to see if it is the last byte of data (block 290) by checking the storage register in the processor (not shown) in which the bar pattern is being stored. The capacity of the register is 150 bar spaces and as the bar patterns are stored, the number of storage positions in the register is reduced until the number of positions is zero. If the register is full, the processor will transfer the bar pattern to the controller 53 (FIG. 3) (block 272). If the register is not full, the processor will update the value of $T_{REF}$ by averaging the last four rationalized counts (block 292), check the value of the updated $T_{REF}$ against the boundaries set (block 294) and wait for the detection of the next bar (block 278). If in checking the value of $T_{REF}$ against the boundary values it finds that the value of $T_{REF}$ exceeds the boundary value, the boundary value is then used as $T_{REF}$.

Figure 11:
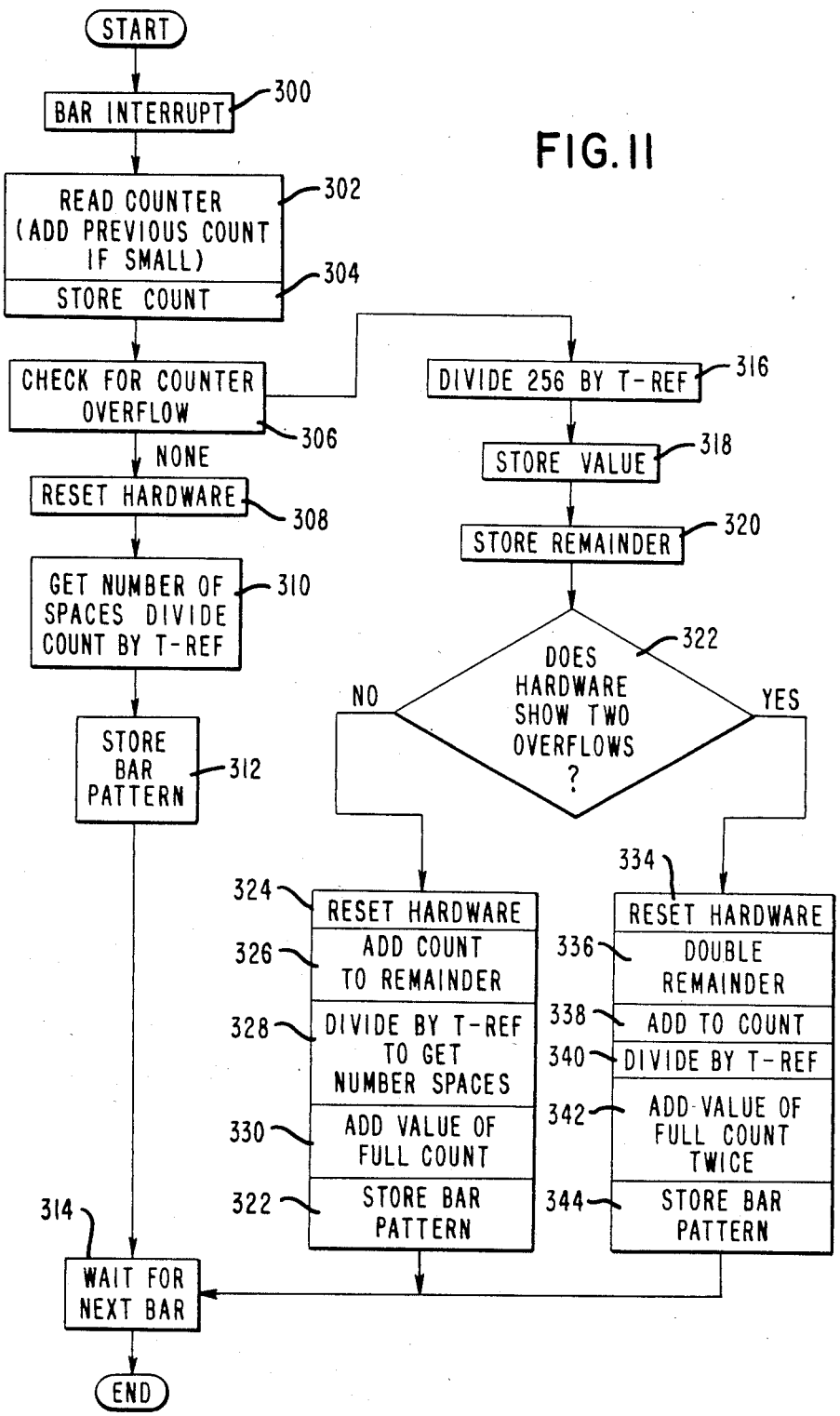
FIG. 11 is a more detailed flowchart of the operation of the processor.

Referring now to FIG. 11, there is shown a more detailed block diagram of the operation of the processor upon receiving the signal INT/. After receiving the signal INT/, (block 300) the processor 70 will read the output of the counter 78 (FIG. 6D) (block 302). If the previous count had been much less than the value of $T_{REF}$ which may occur as a result of detecting ink splatter on the document, the processor will add the previous count to the present count and store the resultant count (block 304). The processor will check (block 306) its $T_0$ input (FIG. 6C) to determine if an overflow condition is present. If no overflow condition exists, the processor: resets the flip-flops 98 and 108-116 (even numbered) inclusive (block 308); determines the bar pattern by dividing the count by $T_{REF}$ (block 310); stores the bar pattern (block 312); and waits for the next bar (block 314).

If in checking the $T_0$ input, the processor 70 (FIG. 6C) finds that the $T_0$ signal is high indicating the presence of an overflow condition, the processor will divide (block 316) the count capacity of the 8-bit counter 72 which in the present example is 256, by the $T_{REF}$(block 316), and store the quotient (block 318) and the remainder (block 320). The processor 70 then checks the signal level appearing at pin 36 (FIG. 6C) which, if high, indicates a single overflow and at pin 37 which indicates a double overflow condition (block 322). If the processor finds the presence of a signal overflow condition, it will reset the counter 72 (block 324), add the count to the remainder (block 326), divide the sum by the $T_{REF}$ value (block 328) to determine the number of spaces detected, add (block 330) the quotient to the value of the count stored (block 318), store the bar pattern (block 332) and wait for the next bar (block 314) to be detected.

If in checking the level of the signals present at the input pins 36, 37 (FIG. 6C), the processor finds the signal at pin 36 has a low level and at pin 37 a high level, the processor will reset (block 334) the flip-flops 110 (FIG. 6C) and 112 (FIG. 6D) which outputs the overflow signals, double the remainder (block 336), add the result to the count (block 338), divide the sum by $T_{REF}$ (block 340), add the quotient to a value which is twice the full count (block 342), store the bar pattern (block 344) and wait for the next bar (block 314).

It will be seen that the processing system presently disclosed detects the bar code pattern irrespective of variation in the speed of the document and in the printing of the bars on the document, allowing the system to process bar-coded documents at a high rate of speed.

Numerous modifications and adaptations of the system of the present invention will be apparent to those skilled in the art, and thus, it is intended by the appended claims to cover all such modifications and adaptations which fall within the true spirit and scope of this invention.

We claim:

1. A method for processing a plurality of control signals each representing the sensing of a bar on a coded bar label by a sensing device in which a series of bars and spaces represent a data word comprising the steps of:

generating a first time interval representing the average time of occurrence between a predetermined number of succeeding control signals;

upon the generation of each succeeding control signal, generating a second time interval representing the time of occurrence between the generation of the last control signal and the succeeding control signal;

dividing the second time interval by the first time interval to produce a quotient;

and storing data signals representing the succeeding control signal as a bar when the quotient is a one.

2. The method of claim 1 which further includes the step of storing data signals representing the control signal as a bar preceded by a space when the quotient is two.

3. The method of claim 2 which further includes the steps of storing data signals representing the control signal as a bar preceded by two spaces when the quotient is three.

4. The method of claim 1 which further includes the step of generating an average time interval each time a control signal is generated which includes the time interval of the last control signal generated.

5. A system for processing signals from a coded label representing a data word comprised of bars and spaces;

scanning means for scanning a coded label for bars and for generating a first control signal representing each detected bar;

a source of first clock signals;

counter means coupled to said means for scanning for counting said first clock signals and for outputting a count in response to the spacing between succeeding detected bars;

storage means for storing the output count of said counter means;

and processing means connected to said storage means for reading the count stored in said storage means in response to the generation of said first control signal, said processing means dividing the count read by a value representing the averaged count between the detection of two succeeding bars to generate signals representing the bar and the number of spaces between two succeeding bars detected by said scanning means.

6. The system of claim 5 which further includes first bistable means connected to said scanning means and operated by said first control signal to output a second control signal for transmission to said storage means for enabling said storage means to store the output of said counter means and a third control signal for transmission to said counter means for resetting said counter means.

7. The system of claim 6 in which said counter means generates a first binary signal when the count of said counter means exceeds a first predetermined count and a second binary signal when the count of said counter means exceeds a second predetermined count, said system further includes a second bistable means enabled by said first binary signal to output a third control signal to said processing means indicating the generation of said first binary signal.

8. The system of claim 7 which further includes a third bistable means enabled by said second binary signal to output a fourth control signal for transmission to said processing means indicating the generation of said second binary signal.

9. The system of claim 8 which further includes; a source of second clock signals for operating said second and third bistable means, said second clock signals being inputted into said first bistable means; and gate means connected to said second and third bistable means for gating said second clock signals to said second and third bistable means, said first bistable means disabling said gate means in response to the generation of said first control signal thereby disabling the operation of said second and said third bistable mean by said second clock signal.

10. The system of claim 9 which further includes a fourth bistable means connected to the output of said second bistable means for outputting a fifth control signal to said processing means in response to the outputting of said third control signal notifying said processing means of the generation of said first binary signal.

* * * * *